US012545172B2

(12) United States Patent
Kealey

(10) Patent No.: US 12,545,172 B2
(45) Date of Patent: Feb. 10, 2026

(54) PALLET NET SECUREMENT SYSTEM

(71) Applicant: Sean M. Kealey, Rancho Cucamonga, CA (US)

(72) Inventor: Sean M. Kealey, Rancho Cucamonga, CA (US)

( * ) Notice: Subject to any disclaimer, the term of this patent is extended or adjusted under 35 U.S.C. 154(b) by 776 days.

(21) Appl. No.: 17/741,312

(22) Filed: May 10, 2022

(65) Prior Publication Data

US 2022/0355722 A1 Nov. 10, 2022

Related U.S. Application Data

(60) Provisional application No. 63/186,635, filed on May 10, 2021.

(51) Int. Cl.

*B60P 7/00* (2006.01)
*B60P 7/08* (2006.01)
*B65D 65/10* (2006.01)

(52) U.S. Cl.

CPC ............ *B60P 7/0876* (2013.01); *B65D 65/10* (2013.01); *B65D 2571/00691* (2013.01)

(58) Field of Classification Search

CPC .......... B60P 7/08; B60P 7/0823; B65D 65/10; B65D 2571/00691; B65D 63/10; A41F 1/008; A41F 15/00; A41F 17/04; F41F 9/02; A45F 3/00; A45F 2006/006

USPC ............. 410/100, 34, 96, 97, 101, 102, 115; 24/265 R, 265 EC, 265 H, 265 AL, 24/265 CD, 163 R, 68 R; 224/651, 493, 224/42.39, 901, 578 M

See application file for complete search history.

(56) References Cited

U.S. PATENT DOCUMENTS

| | | | | |
|---|---|---|---|---|
| 2,455,237 | A | 11/1948 | Davis | |
| 2,998,626 | A | 9/1961 | Prete, Jr. | |
| 4,979,776 | A | 12/1990 | Schweickert | |
| 5,050,924 | A | 9/1991 | Hansen | |
| 6,202,263 | B1 * | 3/2001 | Harker | B62J 7/08 2/237 |
| 6,244,139 | B1 | 6/2001 | Huang et al. | |
| 7,779,765 | B2 | 8/2010 | Donnell, Jr. et al. | |
| 8,196,527 | B2 | 6/2012 | Linares | |
| 8,272,821 | B2 * | 9/2012 | Digman | B60P 7/0823 410/115 |
| 11,401,742 | B1 * | 8/2022 | Shanmugam | E05C 17/02 |
| 2006/0075939 | A1 | 4/2006 | Shuert | |
| 2007/0084894 | A1 * | 4/2007 | Burns | B62B 5/00 224/572 |
| 2018/0029519 | A1 * | 2/2018 | Hill | B60P 3/079 |
| 2019/0240529 | A1 * | 8/2019 | Burkinshaw | A63B 21/4043 |

* cited by examiner

*Primary Examiner* — Steven O Douglas
(74) *Attorney, Agent, or Firm* — Law Office of Craig Bohn; Craig E. Bohn

(57) ABSTRACT

A cargo securement system having at least one strap, the strap being connectable to a pallet at each end, where at least one end being an adaptable end, wherein a tension cord is connectable between an anchor point on the strap and a pallet, and the tension cord being housed within a sleeve on the strap.

19 Claims, 8 Drawing Sheets

(Prior Art)

(Prior Art)

(Prior Art)

PALLET NET SECUREMENT SYSTEM

CROSS-REFERENCE TO RELATED APPLICATIONS

This application claims the benefit of U.S. Application No. 63/186,635, filed on May 10, 2021, by the present inventor, entitled "Pallet Net Securement System", which is hereby incorporated by reference in its entirety for all allowable purposes, including the incorporation and preservation of any and all rights to the patentable subject matter of the inventor, such as features, elements, processes and process steps, and improvements that may supplement or relate to the subject matter described herein.

STATEMENT REGARDING FEDERALLY SPONSORED RESEARCH OR DEVELOPMENT

Not Applicable

BACKGROUND OF THE INVENTION

This invention generally relates load securement systems and more specifically it relates to flexible securement and tensioning members encased in protective coverings.

Various cargo securement configurations are known in the field of art, including the use of flexible webbed straps and elastic members. U.S. Pat. No. 2,455,237, filed on Oct. 29, 1946, by Frank Davis, and issued on Nov. 30, 1948, teaches a cargo tie-down blanket comprised of webbed straps attached to a fabric sheet, with hooked "take-ups" on the straps to secure the blanket to a load-carrying pallet. The fabric is shaped with sides to fold down to cover the sides of the cargo, and with a plurality of loops along the length of the webbing to offer additional or alternate securement points for the blanket. U.S. Pat. No. 5,050,924, filed on Jan. 30, 1991, by George Hansen, and issued on Sep. 24, 1991, teaches an expandable tarpaulin assembly comprising a sheet of material with a perimeter and X-pattern array of elasticized tie-down cords routed within protective sleeves, with intermittent gaps in the protective sleeves to permit access to the elasticized cords for attachment to anchor points, and the cords terminating is a hook on each end. U.S. Pat. No. 4,979,776, filed on Jul. 29, 1990, by David Schweickert, filed on Jan. 29, 1990, and issued on Dec. 25, 1990, and U.S. Pat. No. 6,244,139, filed on Jun. 7, 1999, by David Weyand, and issued on May 1, 2001, teach variations of a tarpaulin cover with an elastic band extending around a portion of the perimeter within a hem, where the hem has openings to access the elastic cord for securement to the cargo container. Each of these inventions was found to have utility in their novel and nonobvious designs. Each of these patents is hereby incorporated by reference in its entirety to provide examples of the state of the art and background of the current invention, challenges perceived by those in the field of art, objectives in creating a more desirable design, and to provide examples of standard terms and nomenclature employed in the field of art.

It would be an improvement to the field of art to provide a cargo securement system wherein cargo straps possess anchor points for accepting connection to attachable and replaceable tensioning cords and openable protective sleeves in which the anchor point and tensioning cord may be housed for the protection of the tensioning cord and of users who could be injured by the failure or uncontrolled release of a tensioning cord. It would also be an improvement to the field of art to size the dimensions of the spacing of the cargo straps and tensioning points to accommodate a combination of coordinately sized containers for rapid and safe securement to a cargo pallet.

Other objects and advantages of the present invention may become obvious to the reader and it is intended that these objects and advantages are within the scope of the present invention. To the accomplishment of the above and related objects, this invention may be embodied in the form illustrated in the accompanying drawings. Attention being called to the fact, however, that the drawings are illustrative only, and that changes may be made in the specific construction illustrated and described within the scope of this application.

BRIEF DESCRIPTION OF THE DRAWINGS

The invention will be explained in conjunction with an illustrative embodiment shown in the accompanying drawings, in which.

DESCRIPTION OF THE ILLUSTRATED EMBODIMENT

In this description relative terms may be used, such as "generally and "about". Additionally, measurements are provided, some of which are qualified with a relative term, and others that are not. All measurements provided may include some variations. It is the inventor's intent to point out here and periodically use these words to express that there may be variations to a physical measurement or size being described, but that one of ordinary skill in the art would appreciate the degree of variation that may be present while effectively still within the description of the particular physical relationship.

In this description dimensional and relational terms may be used, such as "length", "width", "longitudinal", and "transverse". Such terms are given their general normal meaning and are used consistently throughout this disclosure to denote the relative relational positioning of elements of the described device and in identifying different similar elements.

Figure 1:
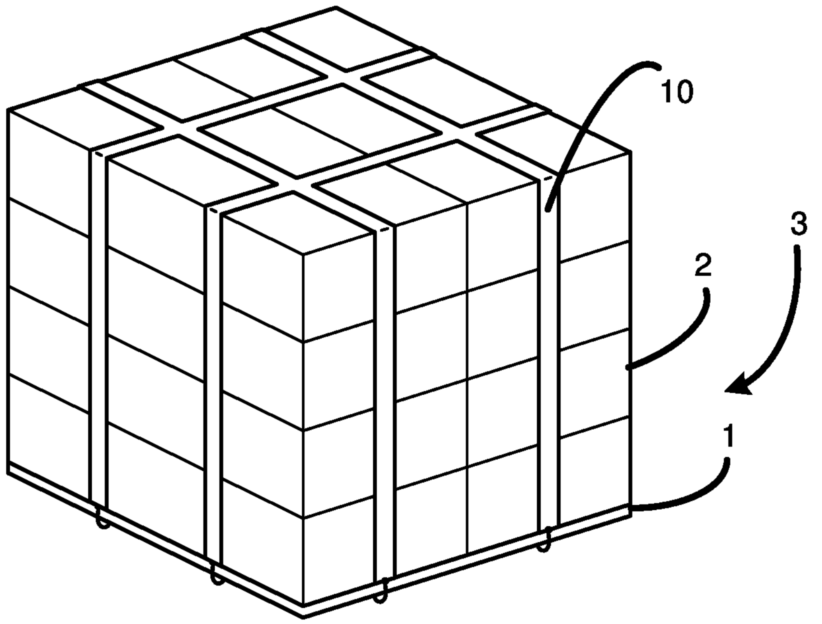
FIG. 1 is a perspective view of a loaded cargo pallet secured by an exemplary embodiment of the present device.
Figure 2:
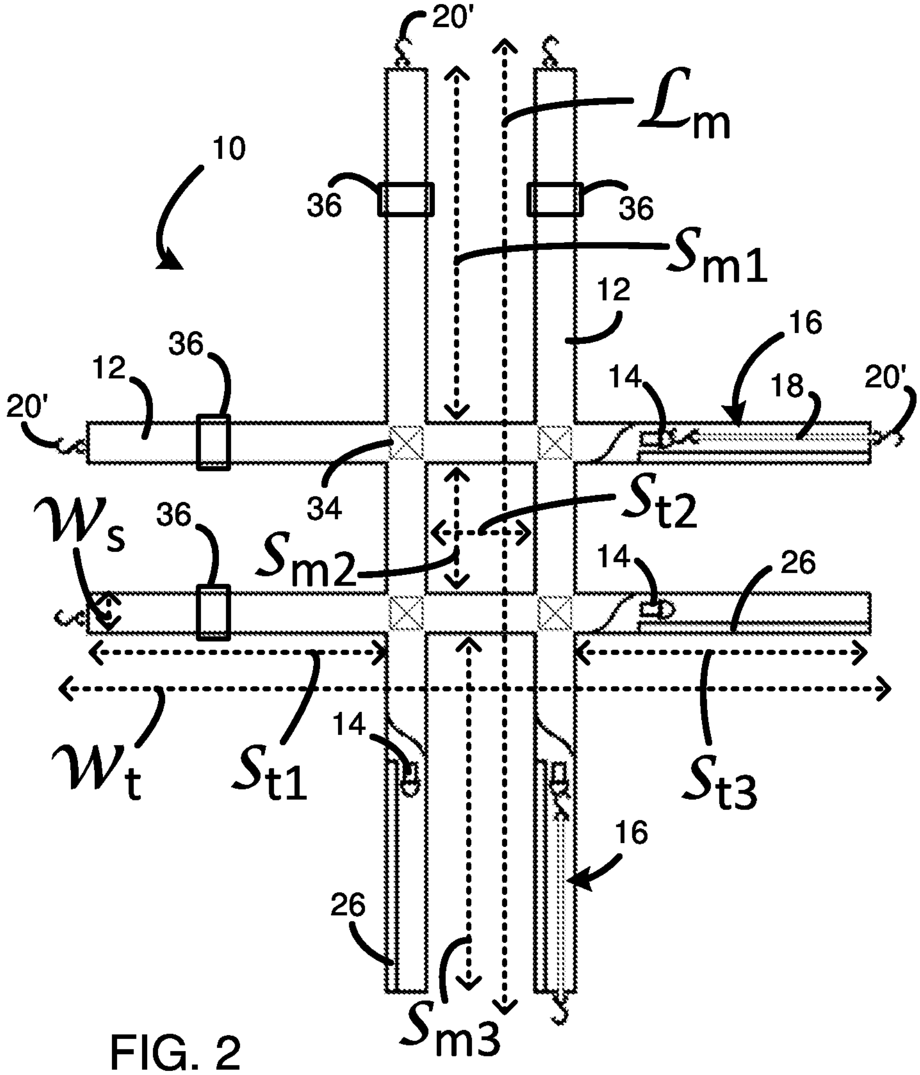
FIG. 2 is a schematic normal view of an exemplary embodiment of the present device.

Turning now descriptively to the drawings, FIG. 1 shows an exemplary embodiment of a securement system 10 configured for use with a loaded pallet 3. The exemplary securement system 10 is shown to secure individual containers (also called bins) 2 on a pallet 1 for transfer as an integral unit. The securement system 10 may be suitable for use with traditional pallets, primarily comprised of wood, as well as alternate pallets, comprised of various materials, including polymers and composites. It is understood by those of ordinary skill in the art that pallets 1 may have attachment points for securement devices, and if they do not inherently, suitable attachment points on a pallet 1 may be easily configured.

The current net securement system 10 may be found to be appropriate for use with other systems besides pallets. The current net securement system 10 may be suitable for use to secure cargo within a transport, such as a truck or trailer. Alternatively, the current net securement system 10 may be suitable for use to secure a barrier, such as a pool cover or temporary walling system. The limitations of the current system are only defined by the formal claims, and the novelty and non-obviousness nature of the system.

Referring now primarily to FIGS. 2 through 5, an exemplary securement system 10 is shown to comprise at least one strap 12, and in some configurations, a plurality of straps 12. In an exemplary embodiment, a strap 12 may have an adaptable end 16. In an exemplary embodiment, an adaptable end 16 may have an anchor point 14. In the exemplary embodiment, a strap 12 may be understood to be a flexible cargo strap, known in the field of art. Additionally, a strap 12 may have a cinching mechanism 36 that would permit adjustment of the length of a portion of strap 12. Cinching mechanisms 36 are known in the field of art, and may include a cam buckle tie-down, a suitable example of which may be available from the Uline Corporation, in Pleasant Prairie, Wisconsin.

Referring now, additionally, to FIGS. 13 through 16, in an exemplary embodiment, an adaptable end 16 may include at least one hook 20 secured to an end of a tension cord 18. In the exemplary embodiment, an adaptable end 16 is shown to have a hook 20 on each end of tension cord 18. One hook 20 may engage anchor point 14 on strap 12, while the other hook 20 is a working hook that may remain free to engage the pallet 1 during use. It is appreciated that an adaptable end may have alternative arrangements for securing a hook 20 to the strap, which may include a tension cord 18. It is appreciated that an adaptable end may have a tension cord 18 secured to the strap 12 in an alternate manner that with the shown anchor point 14. This working hook 20 may be referred to as a net anchor, either separately or in conjunction with other components that facilitate attachment of the net, such as the tension cord 18.

In an exemplary embodiment comprised of multiple straps 12, a pair of straps 12 may be oriented generally parallel to each other. In an exemplary embodiment, one or more straps 12 may be oriented generally perpendicular, or transverse to an other strap 12 or multiple other straps 12. In an exemplary embodiment, two pairs of parallel straps 12 may be generally perpendicular to each other. In the exemplary embodiment, a strap junction 34 may secure two intersecting straps 12. Such a strap junction 34 may comprise of stitching through the strap 12 material to fixedly connect a pair of straps 12.

In an exemplary embodiment, straps 12 may have a strap width $W_s$. In an exemplary embodiment where securement system 10 comprises a pair of straps 12 oriented perpendicular to each other, one strap 12 may have a first strap medial length $S_{m1}$ and a second strap medial length $S_{m3}$, while the other strap 12 may have a first strap transverse length $S_{t1}$ and a second strap transverse length $S_{t3}$. In an exemplary embodiment where securement system 10 comprises two pair of straps 12 oriented perpendicular to each other, one pair of straps 12 may have a first strap medial length $S_{m1}$, an intermediate strap medial length $S_{m2}$, and a second strap medial length $S_{m3}$, while the other strap may have a first strap transverse length $S_{t1}$, an intermediate strap transverse length $S_{t2}$, and a second strap transverse length $S_{t3}$. A distance between any two parallel transverse straps 12 may be referred to as an intermediate strap transverse length $S_{t2}$. It is appreciated that an exemplary embodiment may comprise of one or more straps 12 crossing one or more other straps 12.

In an exemplary embodiment, the securement system 10 may have a strap medial length $L_m$ and a generally perpendicular strap transverse width $w_t$. In an exemplary embodiment, a strap medial length $L_m$ may be an entire length of the strap system 10, and may comprise the first strap medial length $S_{m1}$, a second strap medial length $S_{m3}$, one or more intermediate strap medial lengths $S_{m2}$, and as many strap widths $W_s$ as there are straps 12 perpendicular to the strap medial length $L_m$. In an exemplary embodiment, a strap transverse width $w_t$ may be an entire width of the strap system 10, and may comprise the first strap transverse width $S_{t1}$, a second strap transverse width $S_{t3}$, one or more intermediate strap transverse widths $S_{12}$, and as many strap widths $W_s$ as there are straps 12 perpendicular to the strap transverse width $w_t$.

Figure 3:
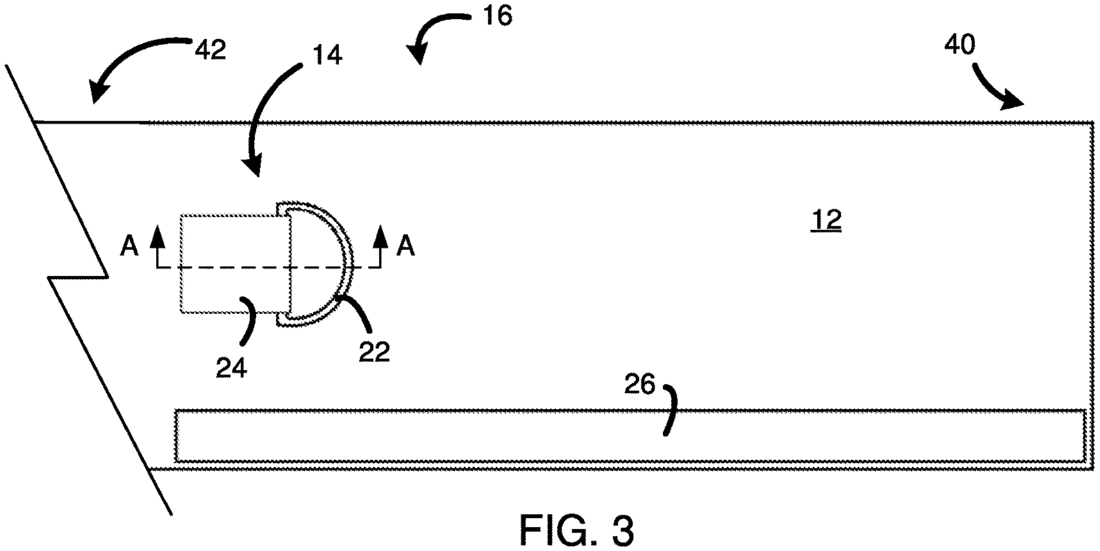
FIG. 3 is a schematic depiction of a portion of a strap shown in FIG. 1 without a cord cover.
Figure 4:
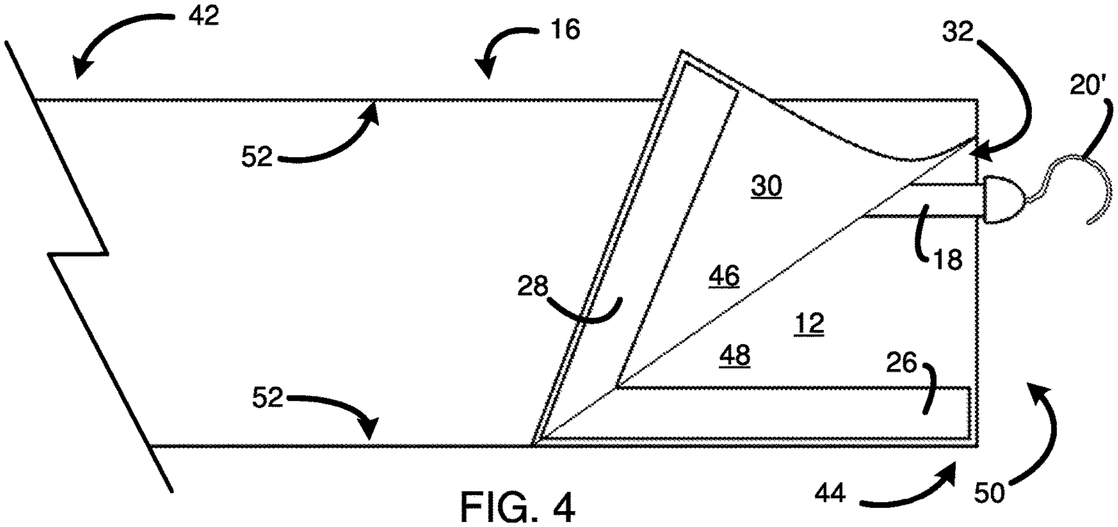
FIG. 4 is a schematic depiction of a portion of a strap shown in FIG. 1 with a cord cover partially folded back.
Figure 5:
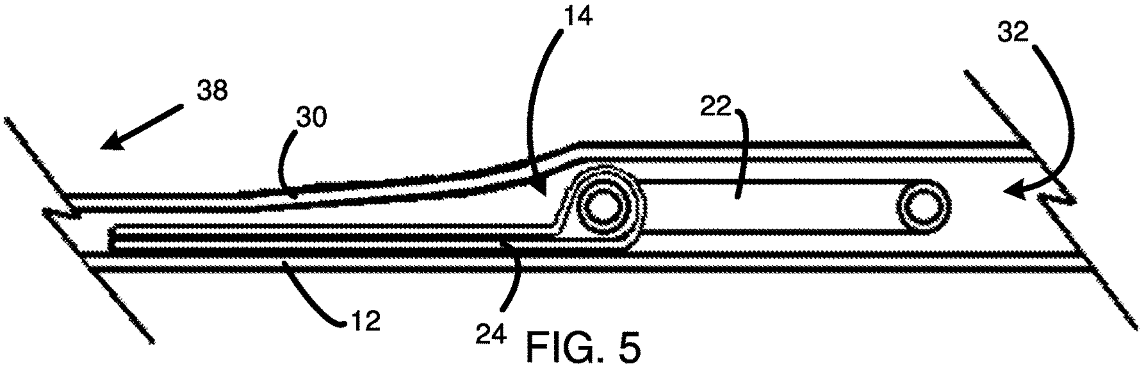
FIG. 5 is a detailed side view of a portion of a strap shown in FIG. 3, and cut at line A_A.

Referring now primarily to FIGS. 3 through 5, details of an exemplary embodiment of an adaptable end 16 of a strap 12 is shown to comprise an anchor point 14 attached to the material of the strap 12. In the exemplary embodiment, an anchor point 14 may include a D-ring 22 attached to the strap 12 by a tab 24. The tab 24 may loop around a portion of the D-ring 22 and lay flat against itself. In this fashion, the tab 24 may be secured back upon itself to secure the D-ring 22 within the fold, and secure the tab 24 to the strap 12. Various forms of securement may be acceptable, to include stitching, rivets, or adhesives.

In an exemplary embodiment, an adaptable end 16 may include a cord cover 30 attached to the strap 12 at opposing outer edges so as to create a sleeve 32. The cord cover may be referred to as a top layer 46 and the strap may be referred to as a bottom layer 48, which together form the sleeve 32. Cord cover 30 may be made of a flexible and durable material, and in an exemplary embodiment, may be made of the same material as the strap 12. The opposing outer edges 52 of the sleeve 32 may run parallel to the length of the tension cord 18. The cord cover 30 may be formed as an integral member of one edge 52 of the strap 12. In the exemplary embodiment, one edge 52 of the cord cover 30 and strap 12 interface may be selectively securable.

Various forms of selective securement may be useable, and may include hook and loop fastener material, snaps, and a zipper, for example. In the exemplary embodiment, a hook strip 26 and a loop strip 28, of a hook and loop fastener material, are securely attached to opposing surfaces of the edges of the strap 12 and the cord cover 30, so that engaging the hook and loop fastener material secures the edges of the strap 12 and cord cover 30. So engaged, the cord cover 30 may form a sleeve 32 on the strap 12.

In the exemplary embodiment, the strap is seen, for orientation purposes, to have a middle 38. In the exemplary embodiment, an adaptable end 16 may be seen to be located or formed at the end of the strap 12, and thereby can be seen to have a strap end 42, closer to the middle 38 of the strap 12, and a terminated end 40, closer to the end of the strap 12. In the exemplary embodiment, an end of a sleeve 32 of an adaptable end 16 may be left open, creating an open end 44 with an opening 50. The hook 20 distal the tab 24 may protrude from this open end 44 the end of the sleeve 32. The sleeve 32 may protect the components of an adaptable end 16, as well as provide a protective barrier to protect a user from various hazard, including a failure or an uncontrolled release of the tension cord 18.

In an exemplary embodiment where a pallet 1 is about 39 inches wide and about 47 inches long, and a plurality of containers 2 each are about 15.5 inches wide by about 23.5 inches long and about 10 inches high, an appropriately sized securement system 10 may include a strap medial length $L_m$ of about 124.5 inches and a strap transverse width $w_t$ of about 117 inches. Such an appropriately sized securement system 10, may have at least one adaptable end 16 that may have a length of 39 inches from the tab 14 to the end of a distal hook, with no tension on the tension cord 18. The maximum length and tension characteristics of a chosen tension cord 18 may determine a maximum height of a supportable loaded pallet 3, and whether that loaded pallet 3 may have four or five levels of bins 2. A strap 12 or pair of straps 12, in the appropriately sized securement system 10, may include a cinching mechanism 36 to permit adjustment of the strap medial length $L_m$ and strap transverse width $w_t$ so as to adapt to variations in the sizes in bins 2, pallets 1, and loaded pallets 3.

Figure 6:
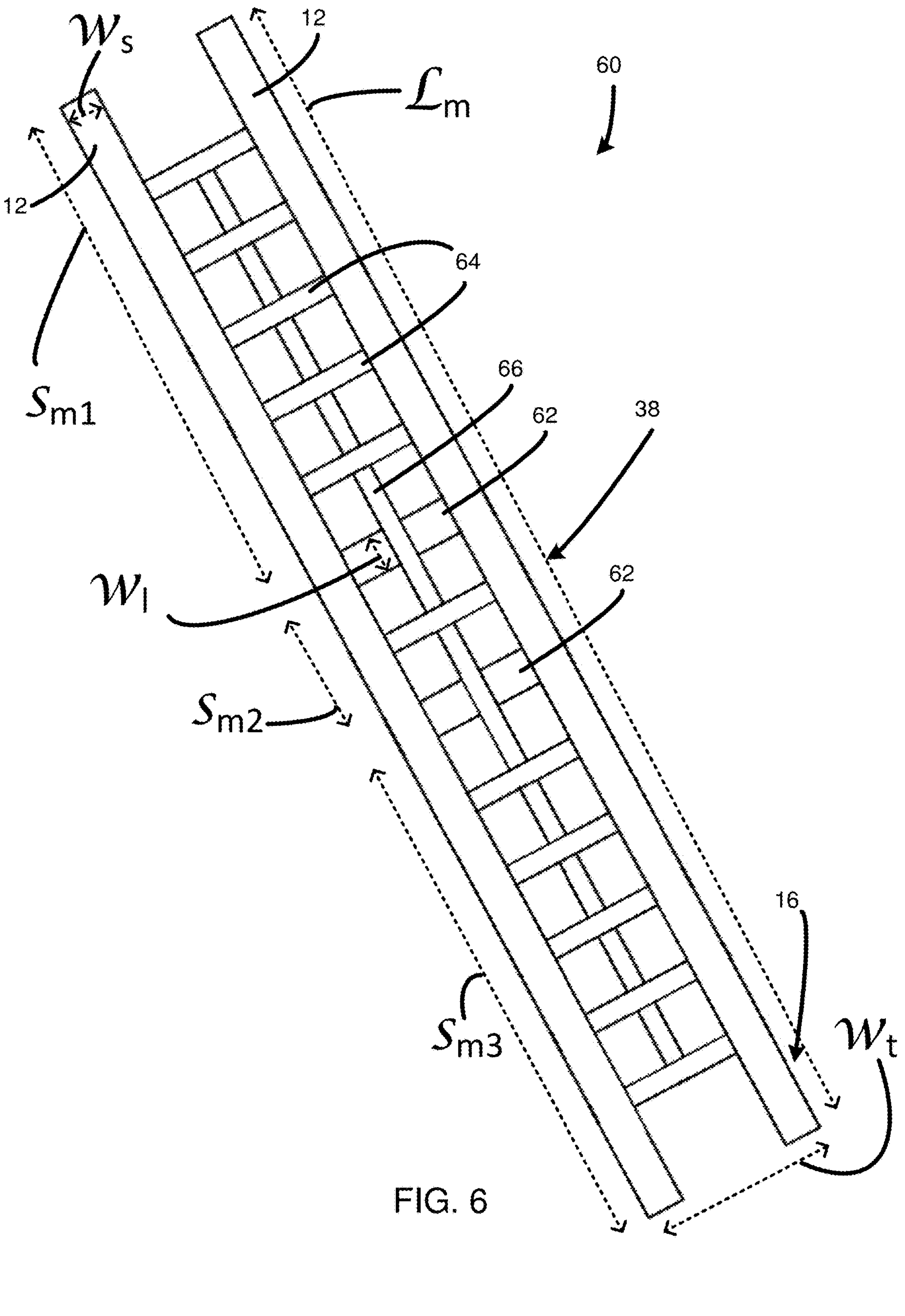
FIG. 6 is a schematic normal view of an alternate exemplary embodiment of the present device.
Figure 7:
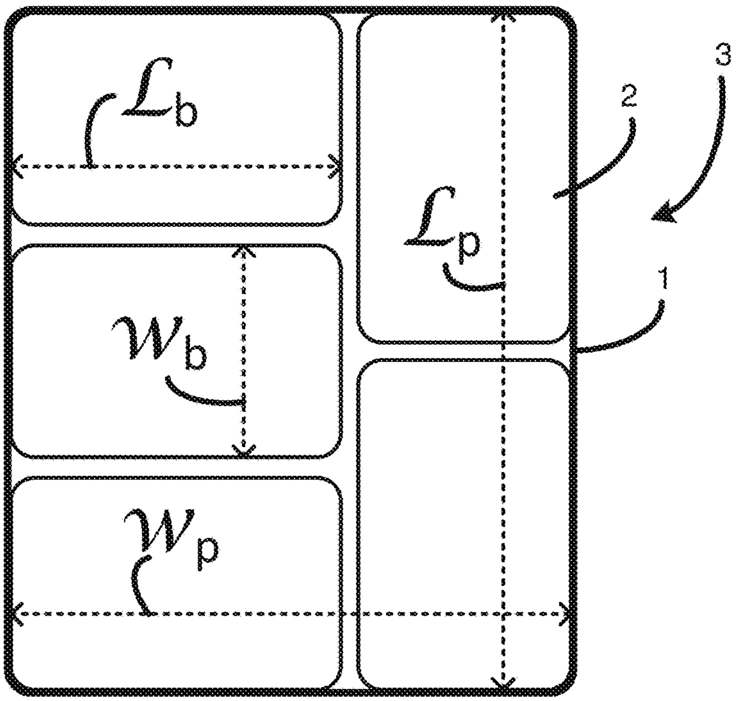
FIG. 7 (Prior Art)
FIG. 7 is a schematic depiction of a top view of a prior art loaded pallet suitable for use with the current device.
Figure 8:
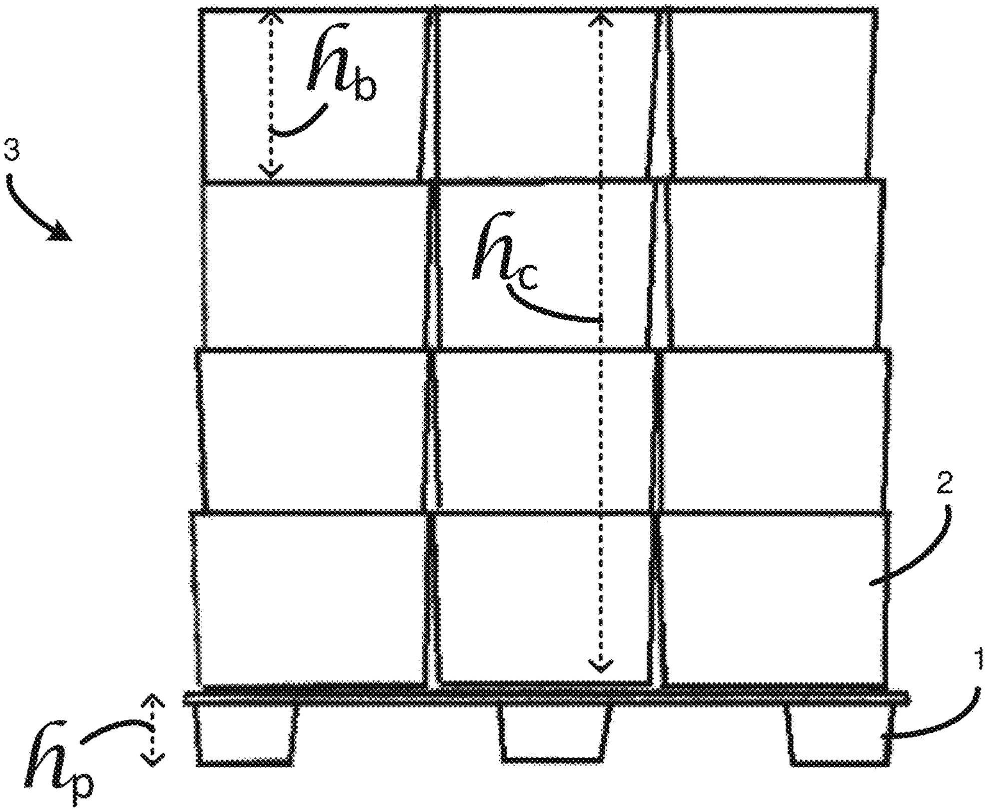
FIG. 8 is a schematic depiction of a side view of a prior art loaded pallet suitable for use with the current device.
Figure 9:
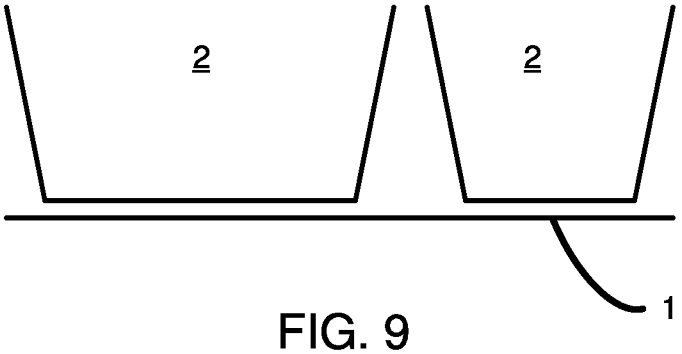
FIG. 9 (Prior Art)
FIGS. 9-11 are schematic depictions of the side view of prior art bins arranged on a pallet suitable for use with the current device.
Figure 10:
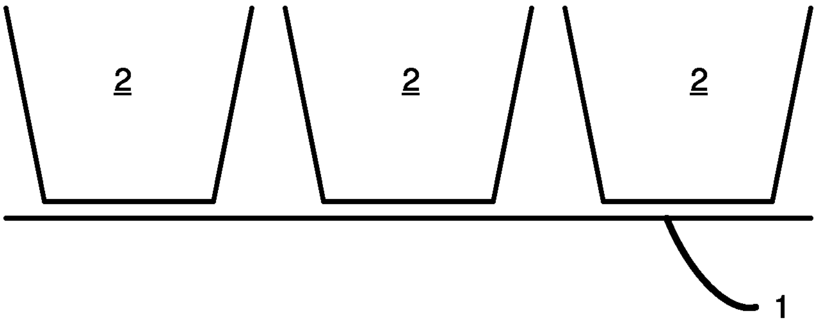
FIG. 10 (Prior Art)
Figure 11:
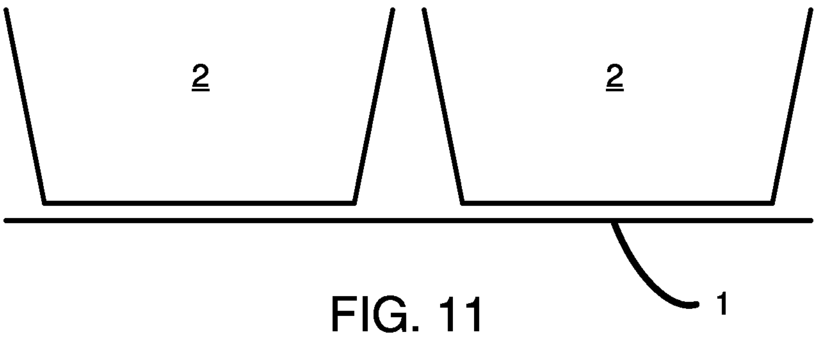
Figure 12:
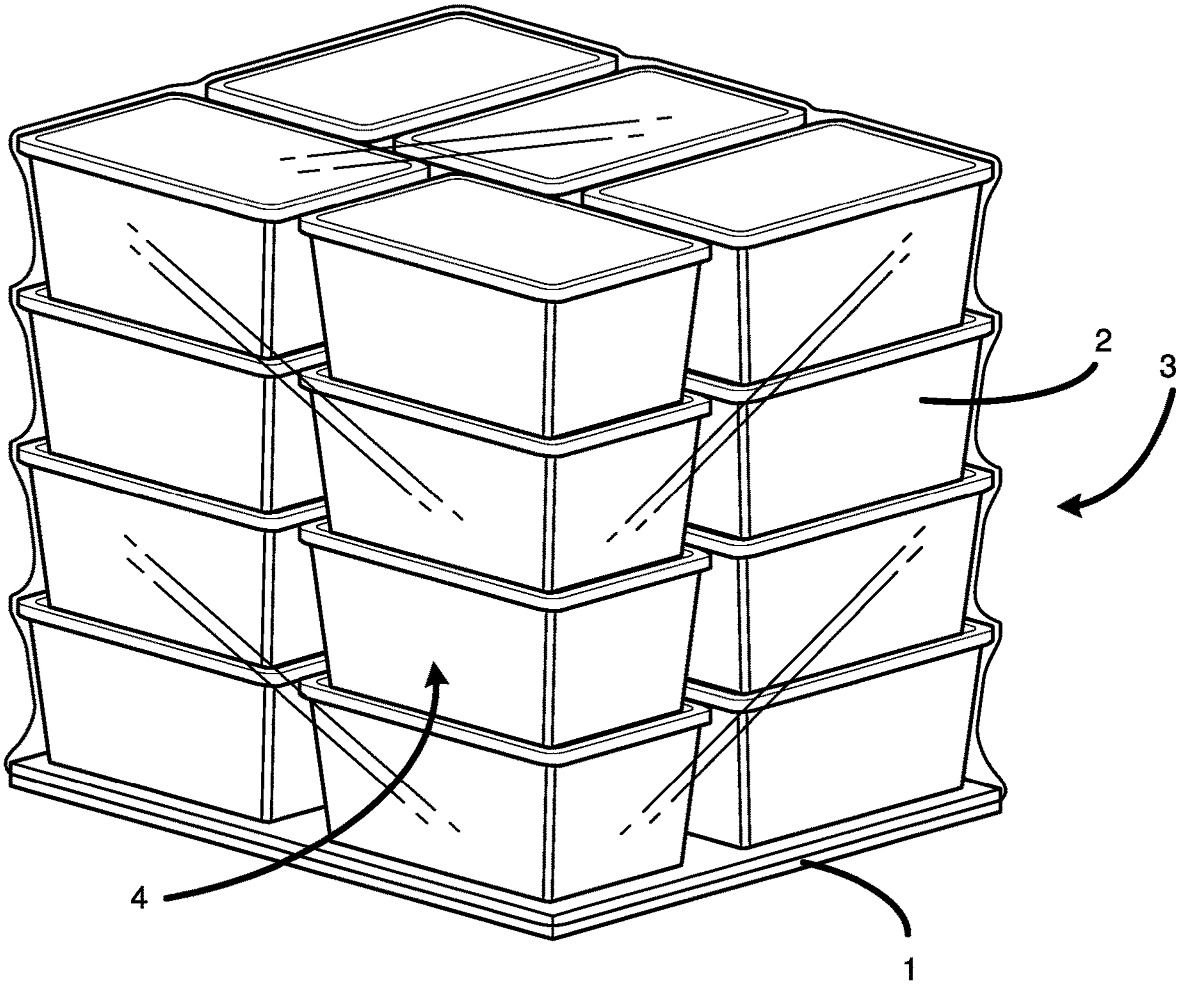
FIG. 12 is a perspective depiction of a prior art loaded pallet with bins secured by a prior art securement wrap.
Figure 13:
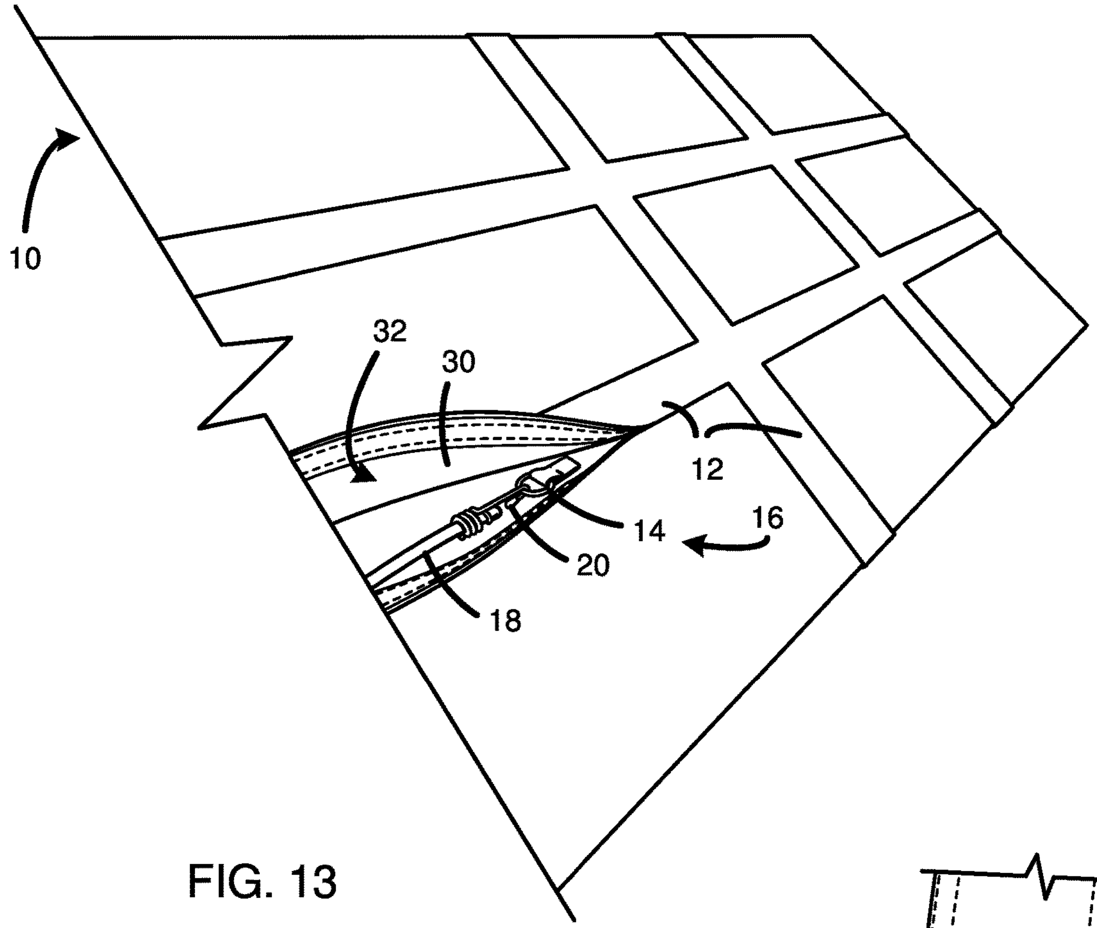
FIG. 13 is a perspective view of an exemplary embodiment of the present device.
Figure 14:
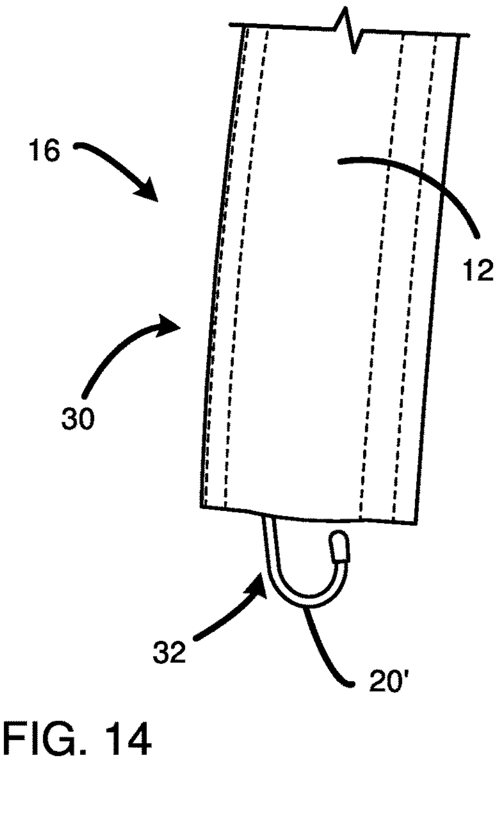
FIG. 14 is a partial view of a strap end of the device shown in FIG. 13.
Figure 15:
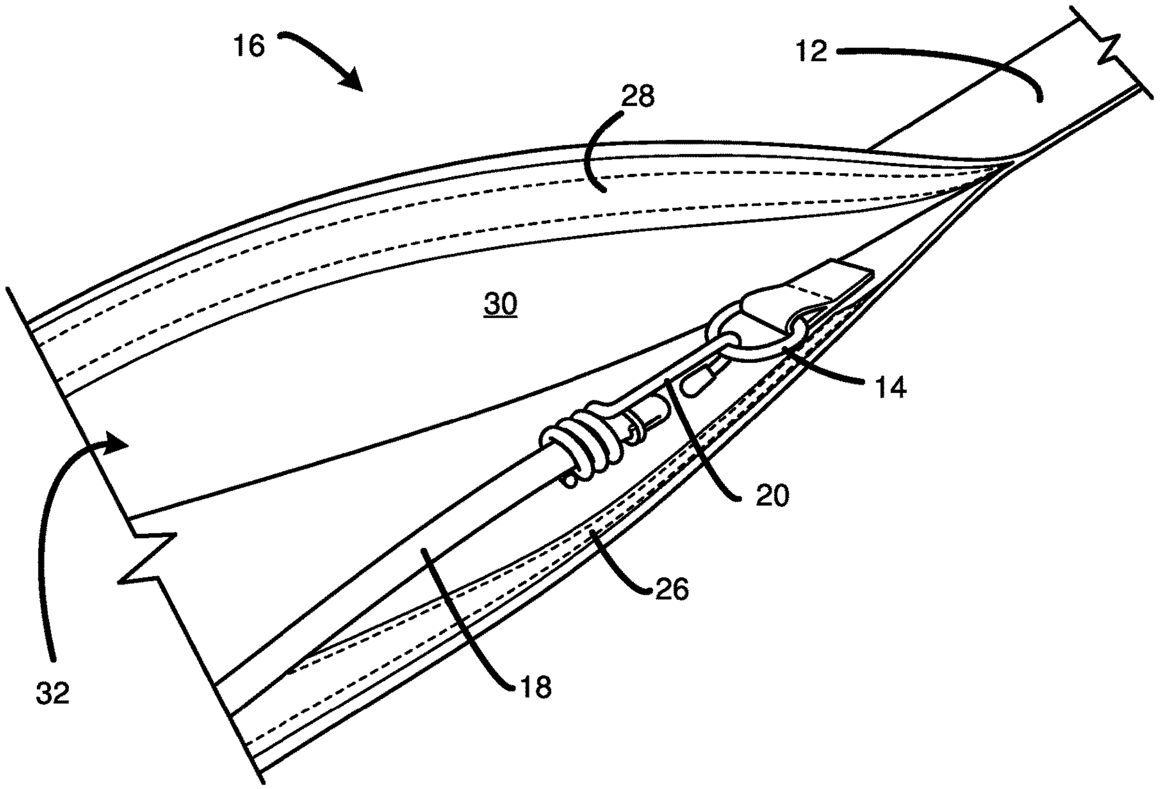
FIG. 15 is a partial view of details of the strap end shown in FIG. 14.
Figure 16:
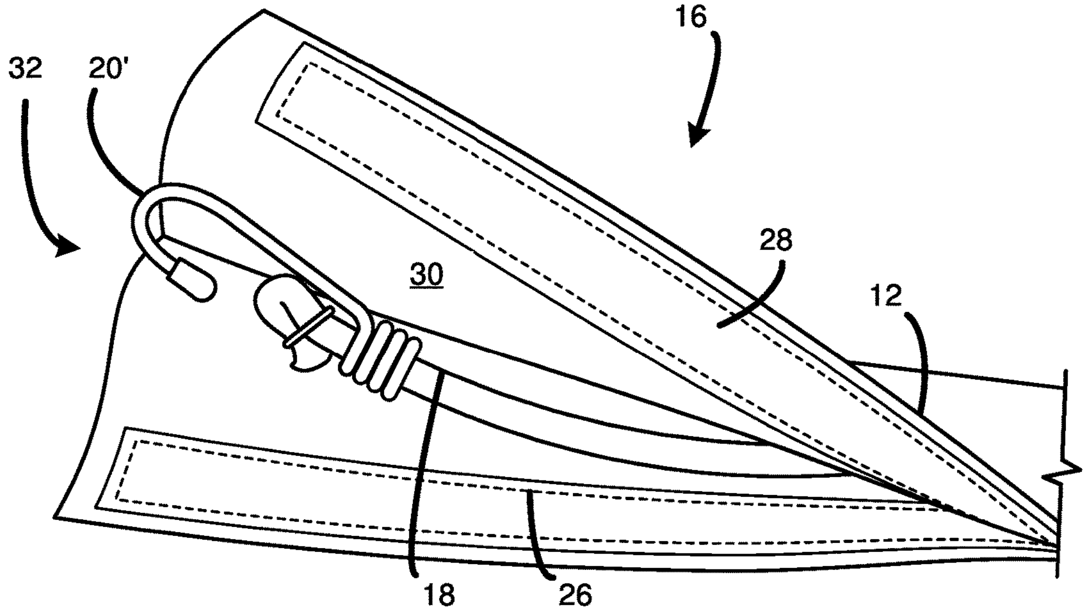
FIG. 16 is a supplemental partial view of details of the strap end shown in FIG. 14.

Referring now additionally to FIG. 6, in an exemplary embodiment, securement system 60 may comprise of multiple straps 12, where a pair of straps 12 may be oriented generally parallel to each other. In an exemplary embodiment, straps 12 may have a strap width $W_s$. In an exemplary embodiment where securement system 60 may comprise a pair of straps 12 oriented parallel to each other. In an exemplary embodiment of securement system 60, a pair of straps 12 may have a first strap medial length $S_{m1}$, an intermediate strap medial length $S_{m2}$, and a second strap medial length $S_{m3}$. In an exemplary embodiment, a strap transverse width $w_t$ may be an entire width of the strap system 60.

In an exemplary embodiment of securement system 60, straps 12 are connected by at least one lateral support 62, oriented generally perpendicularly to the straps 12. In the exemplary embodiment, lateral support 62 may have a lateral support width $W_l$. In an exemplary embodiment, a transverse support 64 may span the distance between parallel straps 12, generally perpendicular to straps 12, and generally parallel to lateral supports 62. In an exemplary embodiment, a securement system 60 may have a longitudinal support 66 connected between parallel straps 12, and generally parallel with straps 12, and generally perpendicular to lateral supports 62 and transverse support 64. In the exemplary embodiment, longitudinal support 66 may not run the entire strap medial length $L_m$, but may end at a transverse support 64. Lateral support 62, transverse support 64, and longitudinal support 66 may be constructed from similar material as the straps 12.

In an exemplary embodiment, the securement system 60 may have a strap medial length $L_m$. In an exemplary embodiment, a strap medial length $L_m$ may be an entire length of the strap system 60, and may comprise the first strap medial length $S_{m1}$, a second strap medial length $S_{m3}$, one or more intermediate strap medial lengths $S_{m2}$, and as many lateral support width $W_l$ as there are lateral supports 62 perpendicular to the strap medial length $L_m$. In each case, as described above, each strap 12 may have an adaptable end 16.

Referring now primarily to FIGS. 7 through 12, exemplary dimensions and configurations of pallets 1, bins 2, and loaded pallets 3 are provided to provide visualization of at least one type of cargo with which securement system 10 may work. In the exemplary prior art illustration, securement wrap 4 is dispensed from a roll, and unrolled and stretched around the diameter of the bins 2. Typical securement wrap 4 is made of a polymer, such as polyethylene, which adheres to itself to secure the bins 2 together, as well as securing the bins 2 to the pallet 1.

The exemplary pallet 1 has a length $L_p$, a width $w_p$, and a height $h_p$. The exemplary bins 2 have a length $L_b$, a width $w_b$, and a height $h_b$. An exemplary loaded pallet 3 may typically be loaded to four or five layers of bins 2, and the combined height of the containers $h_c$ will vary accordingly. Using the exemplary bin height $h_b$ of about 10 inches, four layers of bins 2 will result in a combined height of the containers $h_c$ of about 40 inches. Five layers of bins 2 will result in a combined height of the containers $h_c$ of about 50 inches.

In such an appropriately sized securement system 10, the exemplary strap medial length $L_m$ may include a first strap medial length $S_{m1}$ and a second strap medial length $S_{m3}$, both of 53 inches, one intermediate strap medial length $S_{m2}$ of 12.5 inches, and two strap widths $W_s$ of three inches each. The exemplary strap transverse width $w_t$ may include a first strap transverse width $S_{t1}$ and a second strap transverse width $S_{t3}$, both of 50 inches, one intermediate strap transverse widths $S_{t2}$ of 11 inches, and two strap widths $W_s$ of three inches each.

These examples illustrate only a few configurations that are considered by the inventor within the scope of this disclosure. The foregoing disclosure and description of the invention are illustrative and explanatory thereof. Various changes in the details of the illustrated construction may be made, including varied combinations of the disclosed alternate embodiments, within the scope of the appended claims without departing from the spirit of the invention. The present invention should only be limited by the allowed claims and their legal equivalents.

I claim:

1. A securement system, comprising:

a strap element comprising a length of flexible, durable material, with a strap middle and a terminated end;

the strap element having an adaptable end proximate the terminated end;

the adaptable end having a strap end, a distance away from the terminated end toward the strap middle, and an open end proximate the terminated end;

the adaptable end comprising a top layer and a bottom layer, the top layer and the bottom layer forming an opening at the terminated end;

the adaptable end comprising an anchor point intermediate the top layer and the bottom layer proximate the strap end;

a net anchor attached to the strap at the anchor point; and the net anchor extendable between the top layer and the bottom layer, and through the opening.

2. The securement system of claim 1, further comprising: the top layer and the bottom layer each having an edge, which extend from the strap end to the terminated end; and the edge of the top layer releasably securable to the edge of the bottom layer.

3. The securement system of claim 1, further comprising: the top layer and the bottom layer each having a first edge and a second edge, which extend from the strap end to the terminated end;

the first edge of the top layer securely attached to the first edge of the bottom layer; and the second edge of the top layer releasably securable to the second edge of the bottom layer.

4. The securement system of claim 1, further comprising: the net anchor comprising an elastic cord having a first hook and a second hook;

the first hook attachable to the anchor point; and the second hook extendable through the opening.

5. The securement system of claim 1, further comprising: the top layer and the bottom layer each having an edge, which extend from the strap end to the terminated end;

the edge of the top layer releasably securable to the edge of the bottom layer;

the net anchor comprising an elastic cord having a first hook and a second hook;

the first hook attachable to the anchor point; and the second hook extendable through the opening.

6. The securement system of claim 1, further comprising: the top layer and the bottom layer each having a first edge and a second edge, which extend from the strap end to the terminated end;

the first edge of the top layer securely attached to the first edge of the bottom layer;

the second edge of the top layer releasably securable to the second edge of the bottom layer;

the net anchor comprising an elastic cord having a first hook and a second hook;

the first hook attachable to the anchor point; and the second hook extendable through the opening.

7. The securement system of claim 1, wherein the anchor point is a D-ring.

8. A securement system, comprising:

a strap element comprising a length of flexible, durable material;

one end of the strap element having an anchor point a distance from the end of the strap element, and a cord cover extending from the anchor point to the end of the strap element; and a sleeve removably attached to the strap element at one edge to provide an interior extending from the anchor point to the end of the cord cover and open at the end distal the anchor point.

9. The securement system of claim 8, wherein the anchor point comprises a removable connection to an end of a tension cord.

10. The securement system of claim 9, wherein the tension cord having a second end extendable from the end of the sleeve, and the second end comprises a removable connection to a cargo pallet.

11. The securement system of claim 8, wherein the anchor point is a D-ring.

12. The securement system of claim 11, wherein a hook and loop fastener strip forms the removable attachment of the sleeve to the strap at one edge.

13. A securement system, comprising:

at least four straps, each strap having an anchor point and an end;

at least one strap having the anchor point within an openable protective sleeve attached to the strap;

a first pair of straps, parallel to each other and spaced apart a first distance;

a second pair of straps, perpendicular to the first pair of straps and spaced apart a second distance;

the first pair of straps having a first pair anchor point on each strap a third distance from at least one end of the first pair of straps; and the second pair of straps having a second pair anchor point on each strap a fourth distance from at least one end of the second pair of straps.

14. The cargo securement system of claim 13, further comprising:

the openable protective sleeve comprising one edge removably attachable to an edge of the strap creating an interior extending from the anchor point to the end of the strap; and an opening in the interior at the end of the strap.

15. The cargo securement system of claim 13, wherein the first distance is not equal to the second distance.

16. The cargo securement system of claim 13, wherein the first distance is 11 inches.

17. The cargo securement system of claim 13, wherein the first distance is 12.5 inches.

18. The cargo securement system of claim 13, wherein the third and fourth distances are equal.

19. The cargo securement system of claim 13, wherein the third and fourth distances are equal to or less than 39 inches.

* * * * *